(12) United States Patent
Wong et al.

(10) Patent No.: US 11,041,993 B2
(45) Date of Patent: Jun. 22, 2021

(54) FIBER OPTIC ADAPTER WITH REMOVABLE INSERT FOR POLARITY CHANGE AND REMOVAL TOOL FOR THE SAME

(71) Applicant: Senko Advanced Components Inc, Marlborough, MA (US)

(72) Inventors: Yim Wong, Hong Kong (HK); Jimmy Chang, Worcester, MA (US); Kazuyoshi Takano, Toyko (JP)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/381,322

(22) Filed: Apr. 11, 2019

(65) Prior Publication Data

US 2019/0324215 A1 Oct. 24, 2019

Related U.S. Application Data

(60) Provisional application No. 62/659,933, filed on Apr. 19, 2018.

(51) Int. Cl.
*G02B 6/38* (2006.01)
*G02B 6/42* (2006.01)

(52) U.S. Cl.
CPC .......... *G02B 6/3825* (2013.01); *G02B 6/387* (2013.01); *G02B 6/3826* (2013.01); *G02B 6/3879* (2013.01); *G02B 6/3893* (2013.01); *G02B 6/4256* (2013.01)

(58) Field of Classification Search
CPC .............................. G02B 6/387; G02B 6/3879
See application file for complete search history.

(56) References Cited

U.S. PATENT DOCUMENTS

| | | | |
|---|---|---|---|
| 987,766 | A | 3/1911 | Spiro |
| 3,721,945 | A | 3/1973 | Hults |
| 4,150,790 | A | 4/1979 | Potter |
| 4,327,964 | A | 5/1982 | Haesly |
| 4,478,473 | A | 10/1984 | Frear |
| 4,762,388 | A | 8/1988 | Tanaka |
| 4,764,129 | A | 8/1988 | Jones |
| 4,840,451 | A | 6/1989 | Sampson |
| 4,844,570 | A | 7/1989 | Tanabe |
| 4,872,736 | A | 10/1989 | Myers |
| 4,979,792 | A | 12/1990 | Weber |

(Continued)

FOREIGN PATENT DOCUMENTS

| | | |
|---|---|---|
| CA | 2495693 A1 | 4/2004 |
| CN | 2836038 Y | 11/2006 |

(Continued)

*Primary Examiner* — Sung H Pak

(57) ABSTRACT

An adapter based connector polarity changer is described. A hook insert is placed into an adapter receptacle at a first end or second, and is removable with a removal tool. A hook insert may be permanently placed into an adapter receptacle. The hook insert oriented in the receptacle in a first position and with a first mating structure interconnects with corresponding connector second mating structure to configure the connector in a first polarity, and the hook insert removed and oriented in a second position with the first mating structure interconnects with corresponding connector second mating structure to configure the connector in a second polarity.

14 Claims, 17 Drawing Sheets

(56) References Cited

U.S. PATENT DOCUMENTS

| | | |
|---|---|---|
| 5,041,025 A | 8/1991 | Haitmanek |
| 5,074,637 A | 12/1991 | Rink |
| D323,143 S | 1/1992 | Ohkura |
| 5,212,752 A | 5/1993 | Stephenson |
| 5,265,181 A | 11/1993 | Chang |
| 5,280,552 A | 1/1994 | Yokoi |
| 5,289,554 A | 2/1994 | Cubukciyan |
| 5,317,663 A | 5/1994 | Beard |
| 5,335,301 A | 8/1994 | Newman |
| 5,348,487 A | 9/1994 | Marazzi |
| 5,444,806 A | 8/1995 | de Marchi |
| 5,481,634 A | 1/1996 | Anderson |
| 5,506,922 A | 4/1996 | Grois |
| 5,521,997 A | 5/1996 | Rovenolt |
| 5,570,445 A | 10/1996 | Chou |
| 5,588,079 A | 12/1996 | Tanabe |
| 5,684,903 A | 11/1997 | Kyomasu |
| 5,687,268 A | 11/1997 | Stephenson |
| 5,781,681 A | 7/1998 | Manning |
| 5,915,056 A | 6/1999 | Bradley |
| 5,937,130 A | 8/1999 | Amberg |
| 5,956,444 A | 9/1999 | Duda |
| 5,971,626 A | 10/1999 | Knodell |
| 6,041,155 A | 3/2000 | Anderson |
| 6,049,040 A | 4/2000 | Biles |
| 6,134,370 A | 10/2000 | Childers |
| 6,178,283 B1 | 1/2001 | Weigel |
| 6,186,670 B1 | 2/2001 | Austin |
| RE37,080 E | 3/2001 | Stephenson |
| 6,206,577 B1 | 3/2001 | Hall, III |
| 6,206,581 B1 | 3/2001 | Driscoll |
| 6,227,717 B1 | 5/2001 | Ott |
| 6,238,104 B1 | 5/2001 | Yamakawa |
| 6,247,849 B1 | 6/2001 | Liu |
| 6,347,888 B1 | 2/2002 | Puetz |
| 6,461,054 B1 | 10/2002 | Iwase |
| 6,471,412 B1 | 10/2002 | Belenkiy |
| 6,478,472 B1 | 11/2002 | Anderson |
| 6,530,696 B1 | 3/2003 | Ueda |
| 6,551,117 B2 | 4/2003 | Poplawski |
| 6,579,014 B2 | 6/2003 | Melton |
| 6,634,801 B1 | 10/2003 | Waldron |
| 6,648,520 B2 | 11/2003 | McDonald |
| 6,682,228 B2 | 1/2004 | Rathnam |
| 6,685,362 B2 | 2/2004 | Burkholder |
| 6,695,486 B1 | 2/2004 | Falkenberg |
| 6,785,460 B2 | 8/2004 | de Jong |
| 6,817,780 B2 | 11/2004 | Ngo |
| 6,854,894 B1 | 2/2005 | Yunker |
| 6,872,039 B2 | 3/2005 | Baus |
| 6,935,789 B2 | 8/2005 | Gross, III |
| 7,020,376 B1 | 3/2006 | Dang |
| 7,036,993 B2 | 5/2006 | Luther |
| 7,077,576 B2 | 7/2006 | Luther |
| 7,090,406 B2 | 8/2006 | Melton |
| 7,090,407 B2 | 8/2006 | Melton |
| 7,091,421 B2 | 8/2006 | Kukita |
| 7,111,990 B2 | 9/2006 | Melton |
| 7,113,679 B2 | 9/2006 | Melton |
| D533,504 S | 12/2006 | Lee |
| D534,124 S | 12/2006 | Taguchi |
| 7,150,567 B1 | 12/2006 | Luther |
| 7,153,041 B2 | 12/2006 | Mine |
| 7,207,724 B2 | 4/2007 | Gurreri |
| D543,146 S | 5/2007 | Chen |
| 7,241,956 B1 | 7/2007 | Stimpson |
| 7,258,493 B2 | 8/2007 | Milette |
| 7,264,402 B2 | 9/2007 | Theuerkorn |
| 7,281,859 B2 | 10/2007 | Mudd |
| D558,675 S | 1/2008 | Chien |
| 7,315,682 B1 | 1/2008 | En Lin |
| 7,325,976 B2 | 2/2008 | Gurreri |
| 7,325,980 B2 | 2/2008 | Pepe |
| 7,329,137 B2 | 2/2008 | Martin |
| 7,331,718 B2 | 2/2008 | Yazaki |
| 7,354,291 B2 | 4/2008 | Caveney |
| 7,371,082 B2 | 5/2008 | Zimmel |
| 7,387,447 B2 | 6/2008 | Mudd |
| 7,390,203 B2 | 6/2008 | Murano |
| D572,661 S | 7/2008 | En Lin |
| 7,431,604 B2 | 10/2008 | Waters |
| 7,463,803 B2 | 12/2008 | Cody |
| 7,465,180 B2 | 12/2008 | Kusuda |
| 7,510,335 B1 | 3/2009 | Su |
| 7,513,695 B1 | 4/2009 | Lin |
| 7,540,666 B2 | 6/2009 | Luther |
| 7,561,775 B2 | 7/2009 | Lin |
| 7,591,595 B2 | 9/2009 | Lu |
| 7,594,766 B1 | 9/2009 | Sasser |
| 7,641,398 B2 | 1/2010 | O'Riorden |
| 7,654,748 B2 | 2/2010 | Kuffel |
| 7,695,199 B2 | 4/2010 | Teo |
| 7,699,533 B2 | 4/2010 | Milette |
| 7,785,019 B2 | 8/2010 | Lewallen |
| 7,824,113 B2 | 11/2010 | Wong |
| 7,837,395 B2 | 11/2010 | Lin |
| D641,708 S | 7/2011 | Yamauchi |
| 8,186,890 B2 | 5/2012 | Lu |
| 8,192,091 B2 | 6/2012 | Hsu |
| 8,202,009 B2 | 6/2012 | Lin |
| 8,224,146 B2 | 7/2012 | Hackett |
| 8,251,733 B2 | 8/2012 | Wu |
| 8,267,595 B2 | 9/2012 | Lin |
| 8,270,796 B2 | 9/2012 | Nhep |
| 8,408,815 B2 | 4/2013 | Lin |
| 8,465,317 B2 | 6/2013 | Gniadek |
| 8,534,928 B2 | 9/2013 | Cooke |
| 8,556,520 B2 | 10/2013 | Elenbaas |
| 8,622,634 B2 | 1/2014 | Arnold |
| 8,636,424 B2 | 1/2014 | Kuffel |
| 8,636,425 B2 | 1/2014 | Nhep |
| 8,651,749 B2 | 2/2014 | Dainese Júnior |
| 8,678,670 B2 | 3/2014 | Takahashi |
| 8,770,863 B2 | 7/2014 | Cooke |
| 8,855,458 B2 | 10/2014 | Belenkiy |
| 9,239,437 B2 | 1/2016 | Belenkiy |
| 9,323,007 B1 * | 4/2016 | Yang .................... G02B 6/3825 |
| 9,383,539 B2 | 7/2016 | Hill |
| 9,618,702 B2 | 4/2017 | Takano |
| 9,618,703 B2 | 4/2017 | Iizumi |
| 9,658,409 B2 | 5/2017 | Gniadek |
| 9,709,753 B1 | 7/2017 | Chang et al. |
| 9,772,457 B2 | 9/2017 | Hill |
| 9,778,090 B2 | 10/2017 | Hirt |
| 9,778,425 B2 | 10/2017 | Nguyen |
| 9,798,090 B2 | 10/2017 | Takano |
| 9,798,094 B2 | 10/2017 | Kuffel |
| 9,933,582 B1 | 4/2018 | Lin |
| 9,939,589 B2 | 4/2018 | Takano |
| 9,977,199 B2 | 5/2018 | Chang |
| 2001/0010741 A1 | 8/2001 | Hizuka |
| 2002/0191919 A1 | 12/2002 | Nolan |
| 2003/0007739 A1 | 1/2003 | Perry |
| 2003/0053787 A1 | 3/2003 | Lee |
| 2003/0063867 A1 | 4/2003 | McDonald |
| 2003/0147598 A1 | 8/2003 | McPhee |
| 2003/0156796 A1 | 8/2003 | Rathnam |
| 2003/0161586 A1 | 8/2003 | Hirabayashi |
| 2004/0047566 A1 | 3/2004 | McDonald |
| 2004/0052473 A1 | 3/2004 | Seo |
| 2004/0136657 A1 | 7/2004 | Ngo |
| 2004/0141693 A1 | 7/2004 | Szilagyi |
| 2004/0161958 A1 | 8/2004 | Togami |
| 2004/0234209 A1 | 11/2004 | Cox |
| 2004/0264873 A1 | 12/2004 | Smith |
| 2005/0111796 A1 | 5/2005 | Matasek |
| 2005/0141817 A1 | 6/2005 | Yazaki |
| 2005/0213897 A1 | 9/2005 | Palmer |
| 2006/0089049 A1 | 4/2006 | Sedor |
| 2006/0127025 A1 | 6/2006 | Haberman |
| 2006/0269194 A1 | 11/2006 | Luther |
| 2006/0274411 A1 | 12/2006 | Yamauchi |
| 2007/0025665 A1 | 2/2007 | Dean |
| 2007/0028409 A1 | 2/2007 | Yamada |

(56) References Cited

U.S. PATENT DOCUMENTS

| | | |
|---|---|---|
| 2007/0079854 A1 | 4/2007 | You |
| 2007/0098329 A1 | 5/2007 | Shimoji |
| 2007/0149062 A1 | 6/2007 | Long |
| 2007/0230874 A1 | 10/2007 | Lin |
| 2007/0232115 A1 | 10/2007 | Burke |
| 2007/0243749 A1 | 10/2007 | Wu |
| 2008/0008430 A1 | 1/2008 | Kewitsch |
| 2008/0026647 A1 | 1/2008 | Boehnlein |
| 2008/0044137 A1 | 2/2008 | Luther |
| 2008/0069501 A1 | 3/2008 | Mudd |
| 2008/0101757 A1 | 5/2008 | Lin |
| 2008/0226237 A1 | 9/2008 | O'Riorden |
| 2008/0267566 A1 | 10/2008 | En Lin |
| 2009/0022457 A1 | 1/2009 | de Jong |
| 2009/0028507 A1 | 1/2009 | Jones |
| 2009/0148101 A1 | 6/2009 | Lu |
| 2009/0196555 A1 | 8/2009 | Lin |
| 2009/0214162 A1 | 8/2009 | O'Riorden |
| 2009/0220197 A1 | 9/2009 | Gniadek |
| 2009/0226140 A1 | 9/2009 | Belenkiy |
| 2009/0269014 A1 | 10/2009 | Winberg |
| 2010/0034502 A1 | 2/2010 | Lu |
| 2010/0092136 A1 | 4/2010 | Nhep |
| 2010/0129031 A1 | 5/2010 | Danley |
| 2010/0215322 A1 | 8/2010 | Matsumoto |
| 2010/0247041 A1 | 9/2010 | Szilagyi |
| 2010/0322561 A1 | 12/2010 | Lin |
| 2011/0044588 A1 | 2/2011 | Larson |
| 2011/0081119 A1 | 4/2011 | Togami |
| 2011/0131801 A1 | 6/2011 | Nelson |
| 2011/0177710 A1 | 7/2011 | Tobey |
| 2012/0099822 A1 | 4/2012 | Kuffel |
| 2012/0128305 A1 | 5/2012 | Cooke |
| 2012/0189260 A1 | 7/2012 | Kowalczyk |
| 2012/0269485 A1 | 10/2012 | Haley |
| 2012/0301080 A1 | 11/2012 | Gniadek |
| 2013/0071067 A1 | 3/2013 | Lin |
| 2013/0089995 A1 | 4/2013 | Gniadek |
| 2013/0094816 A1 | 4/2013 | Lin |
| 2013/0121653 A1 | 5/2013 | Shitama |
| 2013/0170797 A1 | 7/2013 | Ott |
| 2013/0183012 A1 | 7/2013 | Cabanne Lopez |
| 2013/0216185 A1 | 8/2013 | Klavuhn |
| 2013/0322825 A1 | 12/2013 | Cooke |
| 2014/0016901 A1 | 1/2014 | Lambourn |
| 2014/0023322 A1 | 1/2014 | Gniadek |
| 2014/0050446 A1 | 2/2014 | Chang |
| 2014/0133808 A1 | 5/2014 | Hill |
| 2014/0334780 A1 | 11/2014 | Nguyen |
| 2014/0348477 A1 | 11/2014 | Chang |
| 2015/0023646 A1 | 1/2015 | Belenkiy |
| 2015/0078717 A1 | 3/2015 | Lin |
| 2015/0117467 A1 | 4/2015 | Leung |
| 2015/0241642 A1 | 8/2015 | Hikosaka |
| 2015/0241644 A1 | 8/2015 | Lee |
| 2015/0355414 A1 | 12/2015 | Chen |
| 2015/0355417 A1 | 12/2015 | Takano |
| 2015/0378113 A1 | 12/2015 | Good |
| 2016/0041349 A1 | 2/2016 | Pimpinella |
| 2016/0259135 A1 | 9/2016 | Gniadek |
| 2017/0091671 A1 | 3/2017 | Mitarai |
| 2017/0254966 A1 | 9/2017 | Gniadek |
| 2018/0011261 A1 | 1/2018 | Hill |

FOREIGN PATENT DOCUMENTS

| | | |
|---|---|---|
| CN | 201383588 Y | 1/2010 |
| CN | 203981920 U | 12/2014 |
| DE | 19901473 A1 | 7/2000 |
| DE | 202006011910 U1 | 4/2007 |
| DE | 102006019335 A1 | 10/2007 |
| EP | 1072915 A2 | 1/2001 |
| EP | 1074868 A1 | 2/2001 |
| EP | 1211537 A2 | 6/2002 |
| EP | 1245980 A2 | 10/2002 |
| EP | 1566674 A1 | 8/2005 |
| GB | 2111240 A | 6/1983 |
| JP | 2009229545 A | 10/2009 |
| JP | 2009276493 A | 11/2009 |
| TW | 200821653 A | 5/2008 |
| WO | WO0159493 A2 | 8/2001 |
| WO | WO2001079904 A2 | 10/2001 |
| WO | WO2004027485 A1 | 4/2004 |
| WO | WO2008113986 A1 | 9/2008 |
| WO | WO2009135787 A1 | 11/2009 |
| WO | WO2010024851 A2 | 3/2010 |
| WO | WO2012136702 A1 | 10/2012 |
| WO | WO2012162385 A1 | 11/2012 |
| WO | WO2013052070 A1 | 4/2013 |
| WO | WO2013179197 A1 | 12/2013 |
| WO | WO2014028527 A2 | 2/2014 |
| WO | WO2014182351 A1 | 11/2014 |

\* cited by examiner

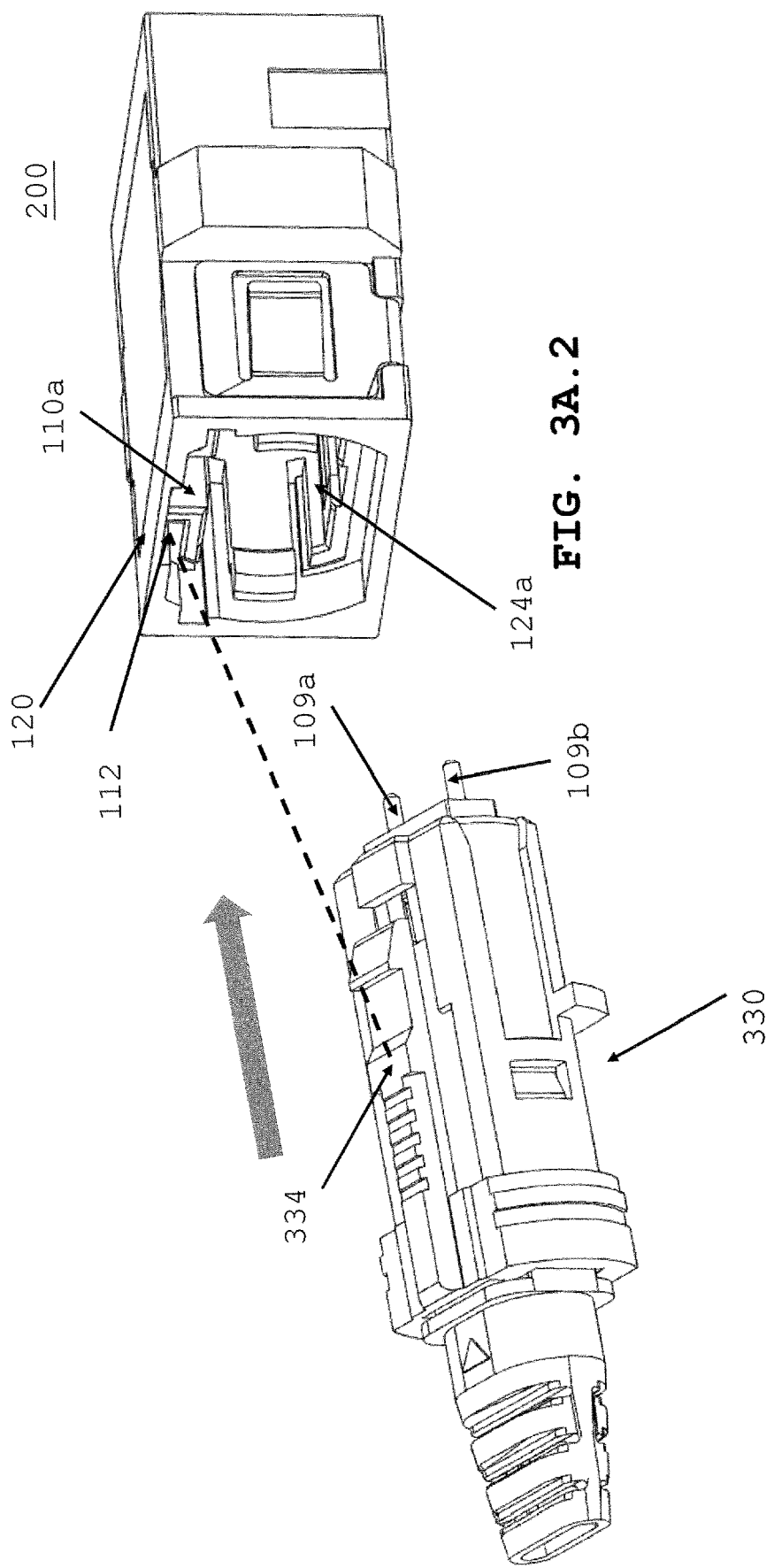

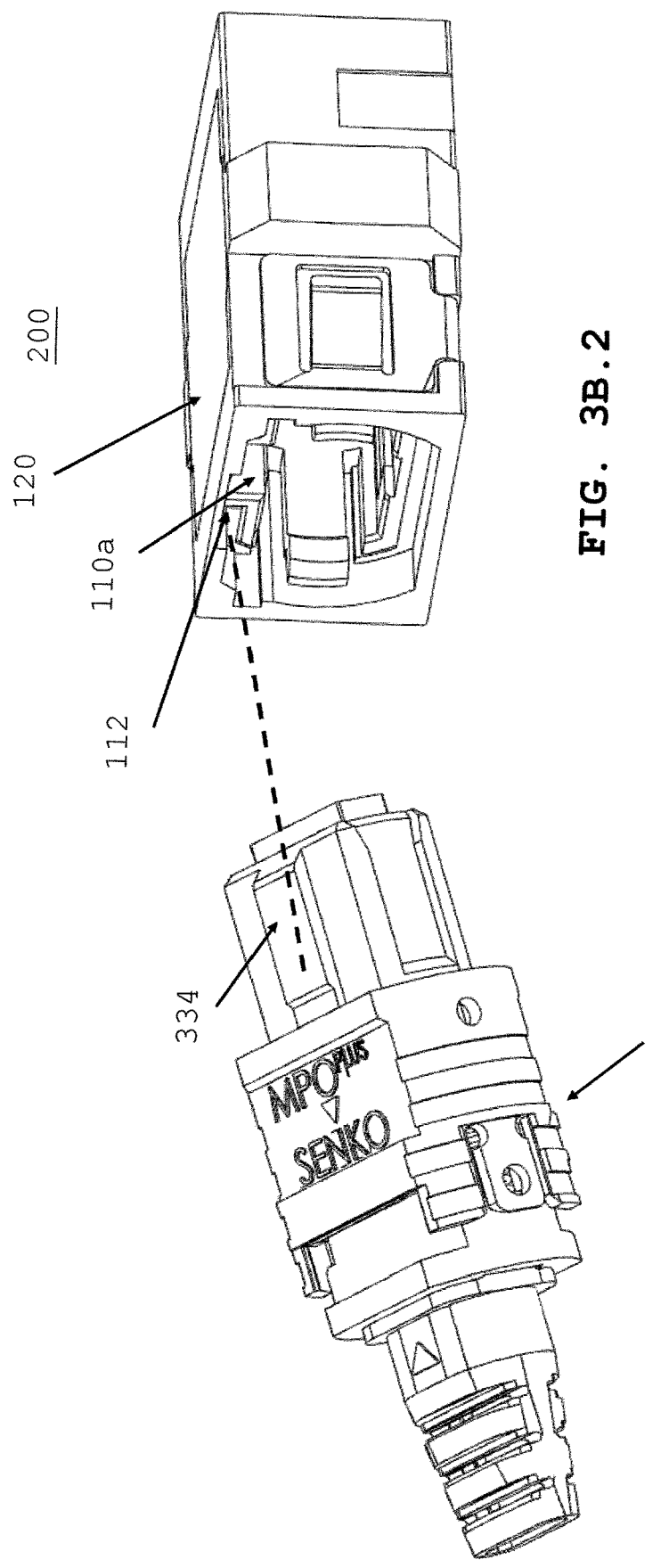
FIG. 3B.1 (Prior Art)
FIG. 3B.2

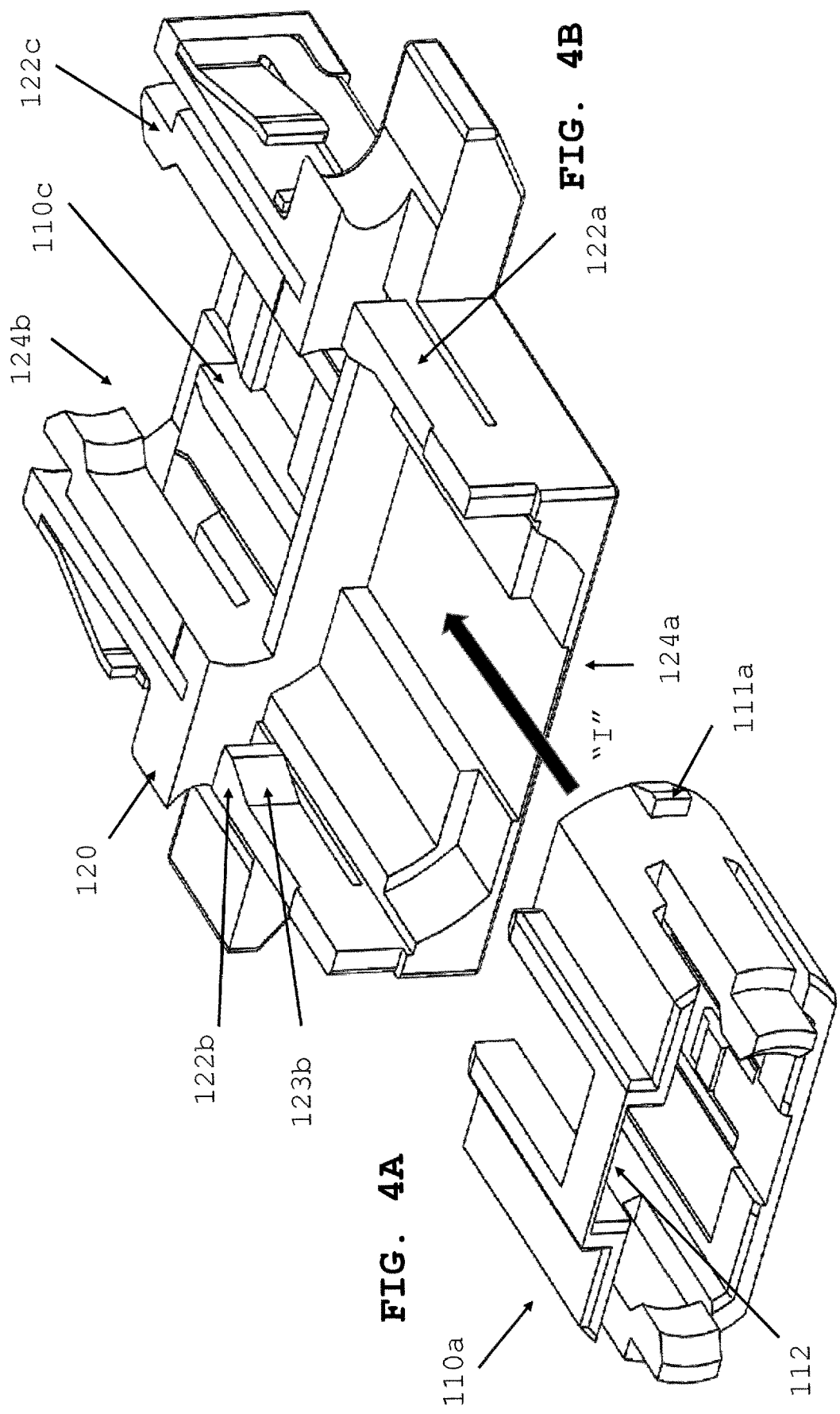

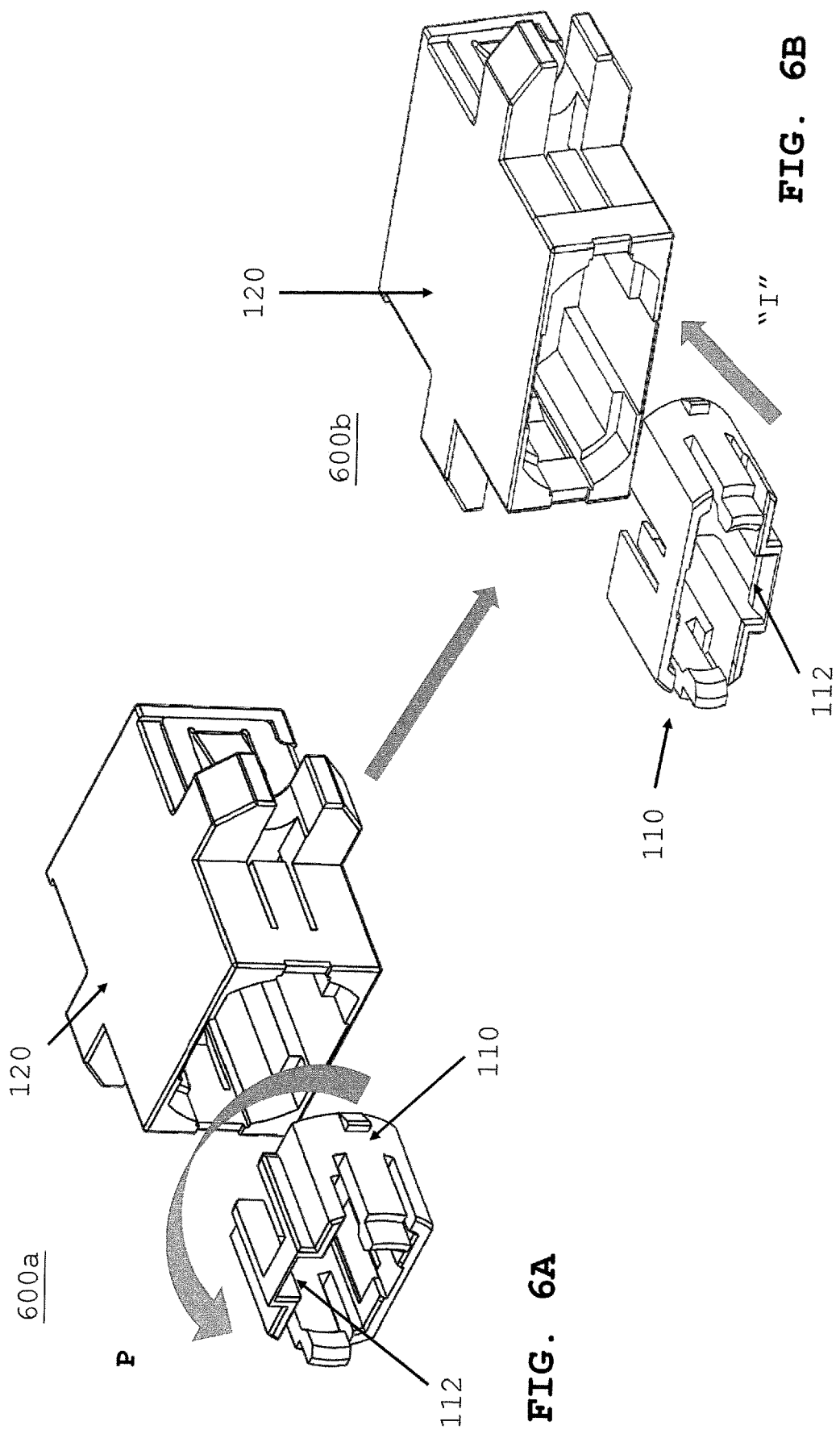

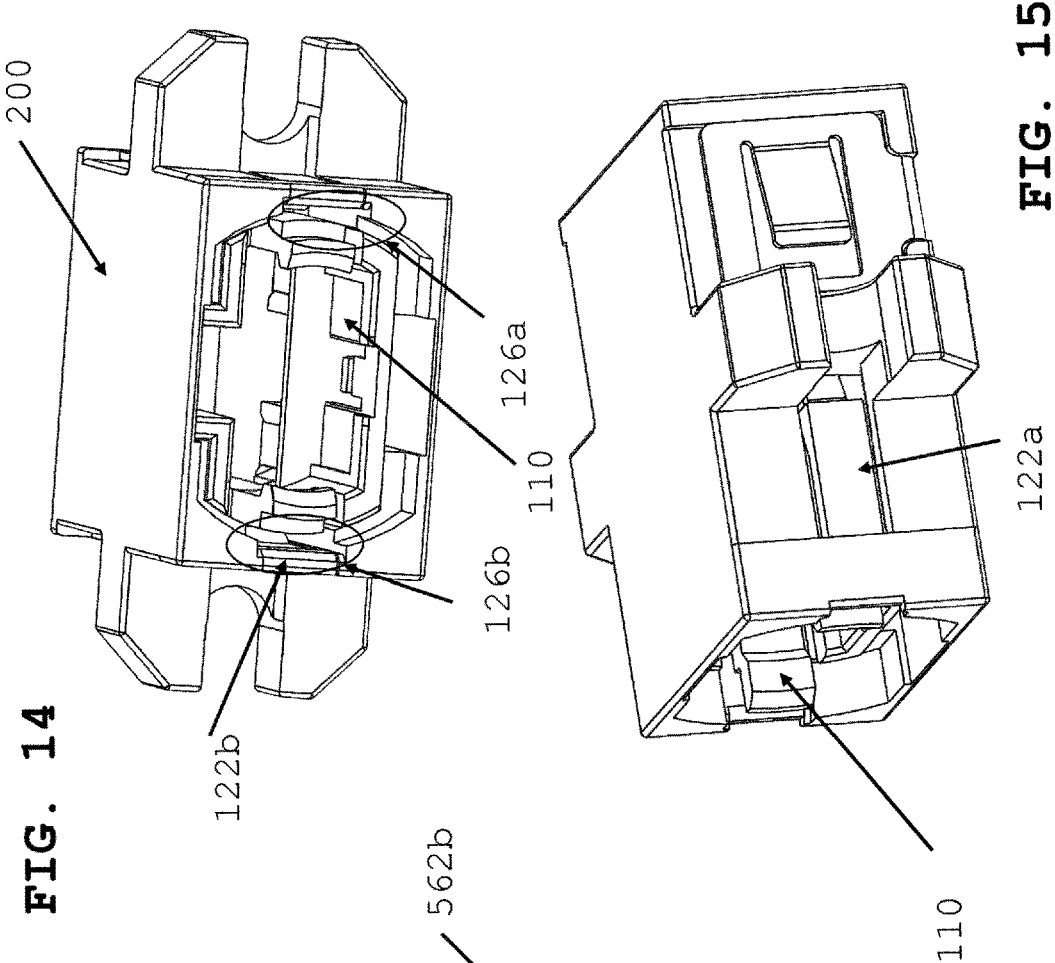
FIG. 14
FIG. 15
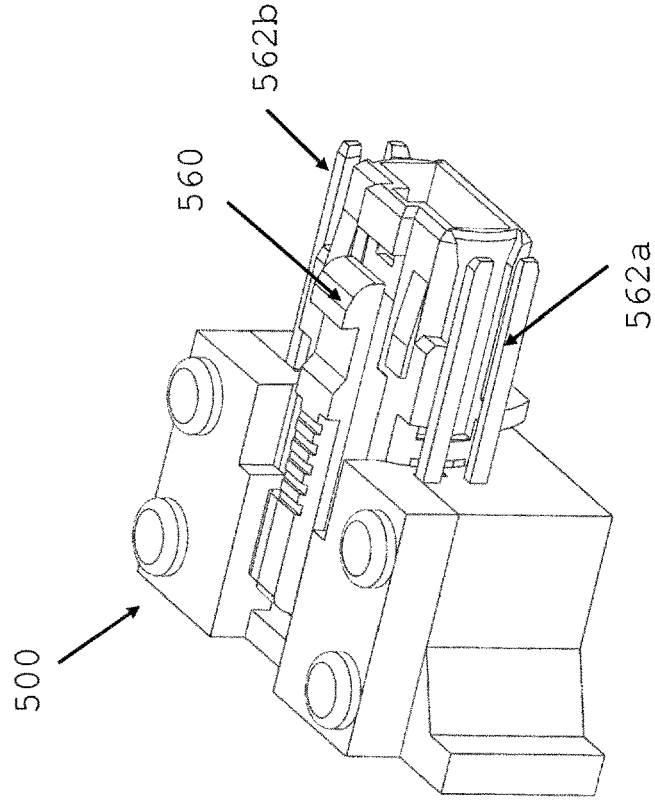
FIG. 13

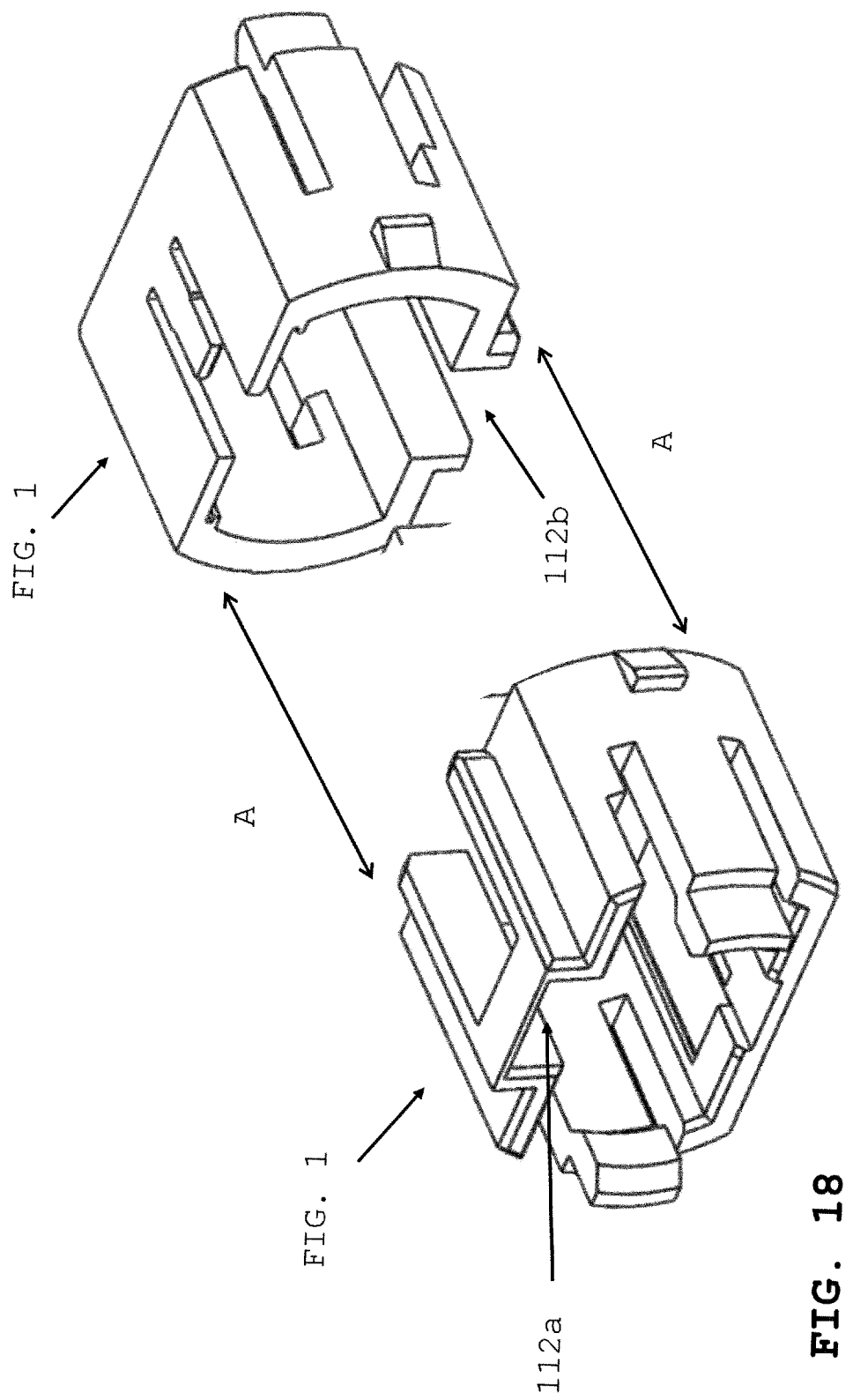

FIBER OPTIC ADAPTER WITH REMOVABLE INSERT FOR POLARITY CHANGE AND REMOVAL TOOL FOR THE SAME

This application claims priority to U.S. Patent Application 62/659,933 filed Apr. 19, 2018 entitled "Fiber Optic Adapter With Removable Insert for Polarity Change and Removal Too for the Same", which is fully incorporated herein by reference.

FIELD OF THE INVENTION

The described technology generally relates to components for connecting data transmission elements and, more specifically, to connectors, adapters, and connection assemblies formed therefrom that are configured to have a reduced profile and/or a reduced quantity of parts in comparison to conventional connection components while providing a secure connection between data transmission elements, such as cable segments, equipment, and/or devices.

BACKGROUND

Demand for bandwidth by enterprises and individual consumers continue to experience exponential growth. To meet this demand efficiently and economically, data centers have to achieve ultra-high density cabling with low loss budgets. Fiber optics have become the standard cabling medium used by data centers to meet the growing needs for data volume and transmission speeds.

Individual optical fibers are extremely small. For example, even with protective coatings, optical fibers may be only about 250 microns in diameter (only about 4 times the diameter of a human hair). As such, hundreds of fibers can be installed in cables that will take up relatively little space. However, terminating these fibers with connectors greatly increases the space required to connect cable segments and communication devices. Although multiple fibers may be arranged within a single connector, the resulting connection component may still increase the space used by the optical fibers by 20 to 50 fold. For example, multi-fiber connectors such as those using multi-fiber push-on/pull-off (MPO) technology may connect 12 or 24 fibers. However, a typical MPO connector may have a length of about 30 millimeters to 50 millimeters and a width of about 10 millimeters to 15 millimeters. Multiplying these dimensions by the hundreds of connections in a typical data center results in a significant amount of space devoted to these cable connections. In order to cost-effectively increase data transmission capacity and speed, data centers must increase the number of fiber optic cables and, therefore, cable connections within existing space. Accordingly, data centers and other communication service providers would benefit from a multi-fiber connector having a reduced profile capable of securely connecting multiple fibers while requiring less space than conventional multi-fiber connectors.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In one aspect, an adapter assembly may include an adapter housing and removable hook insert, the adapter has a first end and a second end for accepting a removable hook insert. The removable hook insert latches a connector inserted therein. The removable hook insert further includes a first mating structure. The first mating structure corresponds with a second mating structure at a proximal end of a connector. The mating of the first and second mating structures results in a first polarity. Removing the hook insert, rotating it 180 degrees, and inserting hook inert into the adapter receptacle changes the polarity of the connector inserted therein without disassembling the connector.

In another aspect, to remove the hook insert a removal tool engages a set of opposing latches located on either side of adapter housing. In one aspect, the tool can be used horizontally across adapter body, or a second tool can be inserted into a receptacle of the adapter to remove the hook insert. In another aspect, a first end of the adapter may have a removable hook insert and a second end may have a fixed hook insert or similar structure to accept and secure a connector therein. The first end may have a removable hook insert and the second end may have a removable hook insert. The second end may have a removable hook insert, and the first end a fixed hook insert or similar structure to secure a connector therein.

BRIEF DESCRIPTION OF THE DRAWINGS

The above and other objects of the present invention will become more readily apparent from the following detailed description taken in connection with the accompanying drawings.

FIG. 3A.1 is a perspective view of a prior art or conventional latch MPO connector without a polarity change feature prior to insertion into an adapter receptacle;

FIG. 3A.2 is a perspective view of the adapter assembly with a hook insert therein determining a first polarity;

FIG. 3B.1 is a perspective view of a conventional MPO connector with a polarity change feature, as part of the connector, prior to insertion into an adapter receptacle;

FIG. 3B.2 is a perspective view of the adapter assembly with a hook insert therein determining a first polarity;

FIG. 4A is a perspective view of a hook insert in a first polarity position;

FIG. 4B is a cross-section view of adapter prior to hook insertion at a first end and a fixed hook at a second end;

FIG. 6A is an exploded view of the adapter and hook insert assembly showing the direction of hook insert rotation to change from a first polarity to a second polarity;

FIG. 6B is an exploded view of hook insert rotated to a second polarity and just prior to insertion into adapter;

FIG. 13 is a perspective view of a horizontal removal tool;

FIG. 14 is a front perspective view of adapter receptacle prior to insertion of horizontal removal tool;

FIG. 15 is a side perspective view of adapter with hook insert therein;

FIG. 18 is an exploded view of hook inserts according to FIG. 1 integrated together to form a dual or two-sided hook insert.

DETAILED DESCRIPTION

The described technology generally relates to components configured to connect data transmission elements, such as cable segments, communication equipment, networking devices, and computing devices. In some embodiments, the data transmission elements may be connected using reduced-profile connection components, including, without limitation, connectors, ferrules, adapters, and connection assemblies formed therefrom. The connectors transmit data as light to and from another connector or to an electronic interface, such as a transceiver. The Tx or transmit or Rx receive must align with the opposing connector or transceiver electronics. In some situations, a first connector is in a first polarity Tx/Rx while a second connector is in a second polarity Rx/Tx. Due to limited space in a data center, the second connector may not be accessible or in the case of a transceiver, the user cannot change the polarity of the electronics, so there is a necessity to change the polarity of the first connector.

The hook insert and adapter housing places the polarity change at the adapter rather than at the connector, as found in prior art devices such as U.S. Pat. No. 9,658,509 Gniadek currently owned by the assignee of this disclosure.

In some embodiments, the data transmission elements may include fiber optic data transmission elements. In some embodiments, the reduced-profile connection components may include components configured to provide a secure connection for fiber optic data transmission elements. In some embodiments, the reduced-profile connection components may be configured to implement various types of fiber optic connection components, including multiple-fiber (or multi-fiber) connection components. Non-limiting examples of multi-fiber connection components include mechanical transfer (MT), multiple-fiber push-on/pull-off (MPO), and multi-fiber MTP® connectors (MTP). Although fiber optic connection components, and MPO-compatible components in particular, are used as examples herein, embodiments are not so limited as any type of data transmission medium and associated components capable of operating according to some embodiments are contemplated herein.

Figure 1:
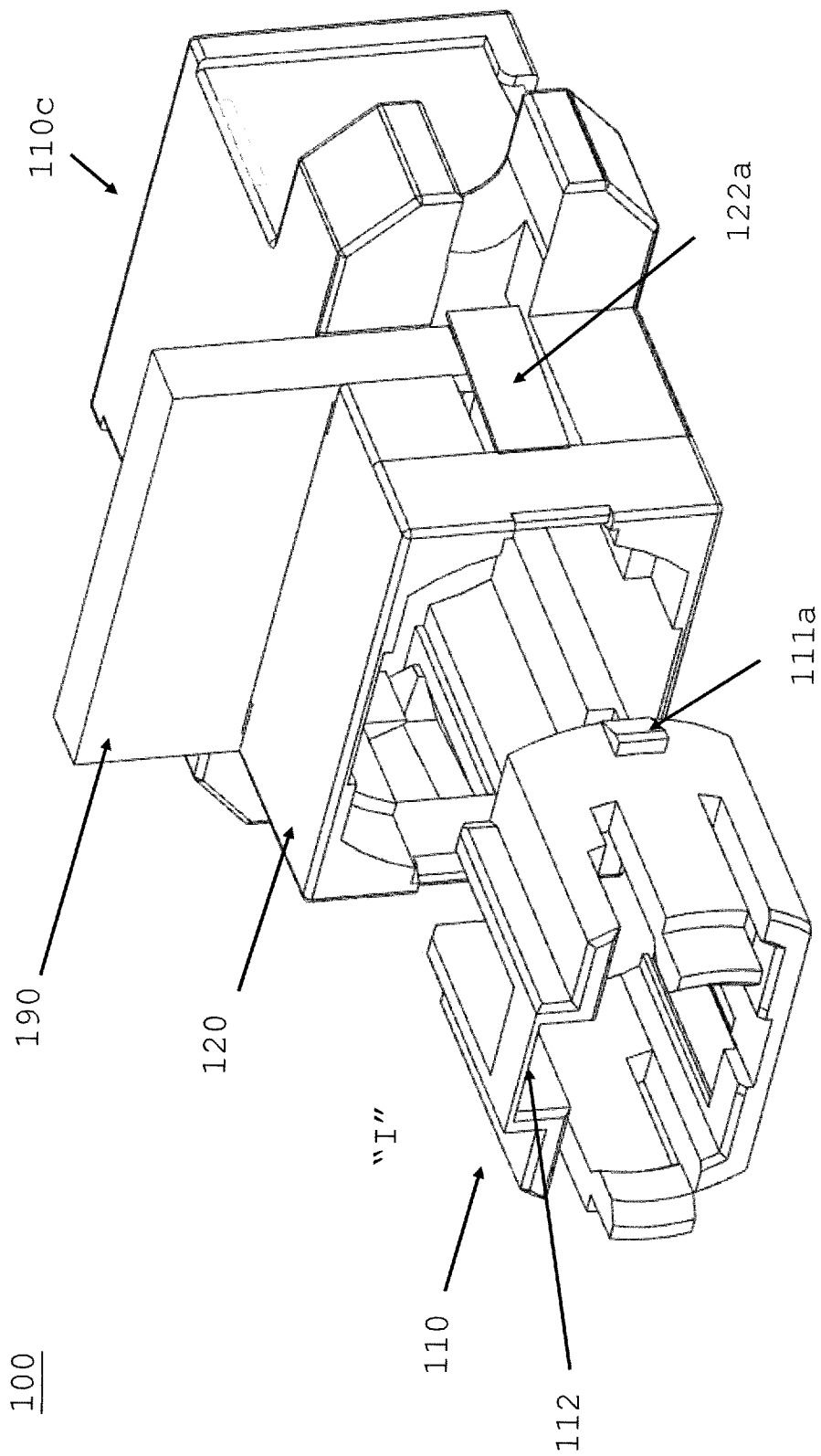
FIG. 1 is an exploded view of a hook insert and an adapter configured to receive the hook insert with a removable tool inserted horizontally across the adapter.
Figure 2:
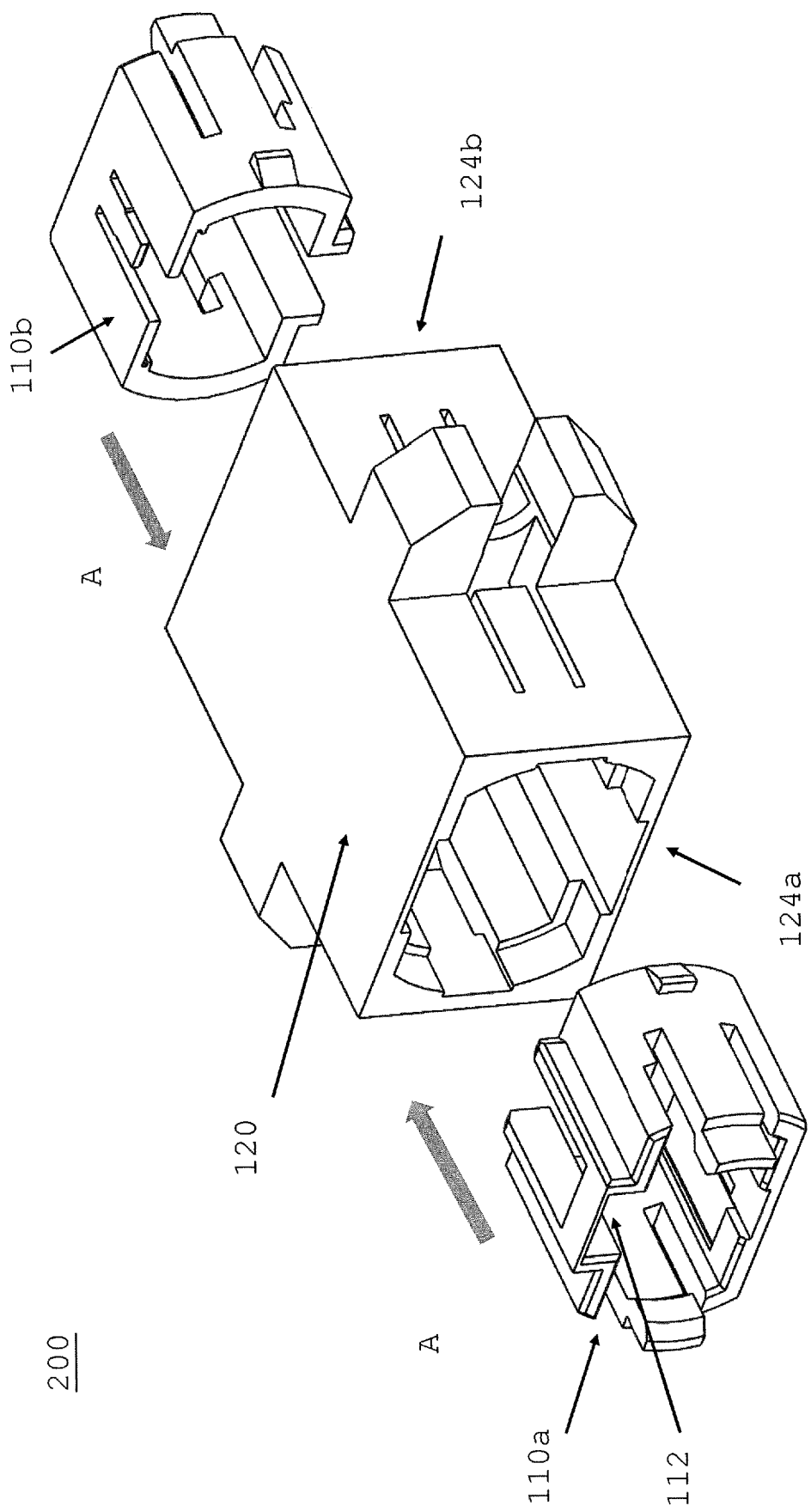
FIG. 2 is an exploded view of a hook insert at a first end and hook insert at a second end of an adapter.
Figure 5A:
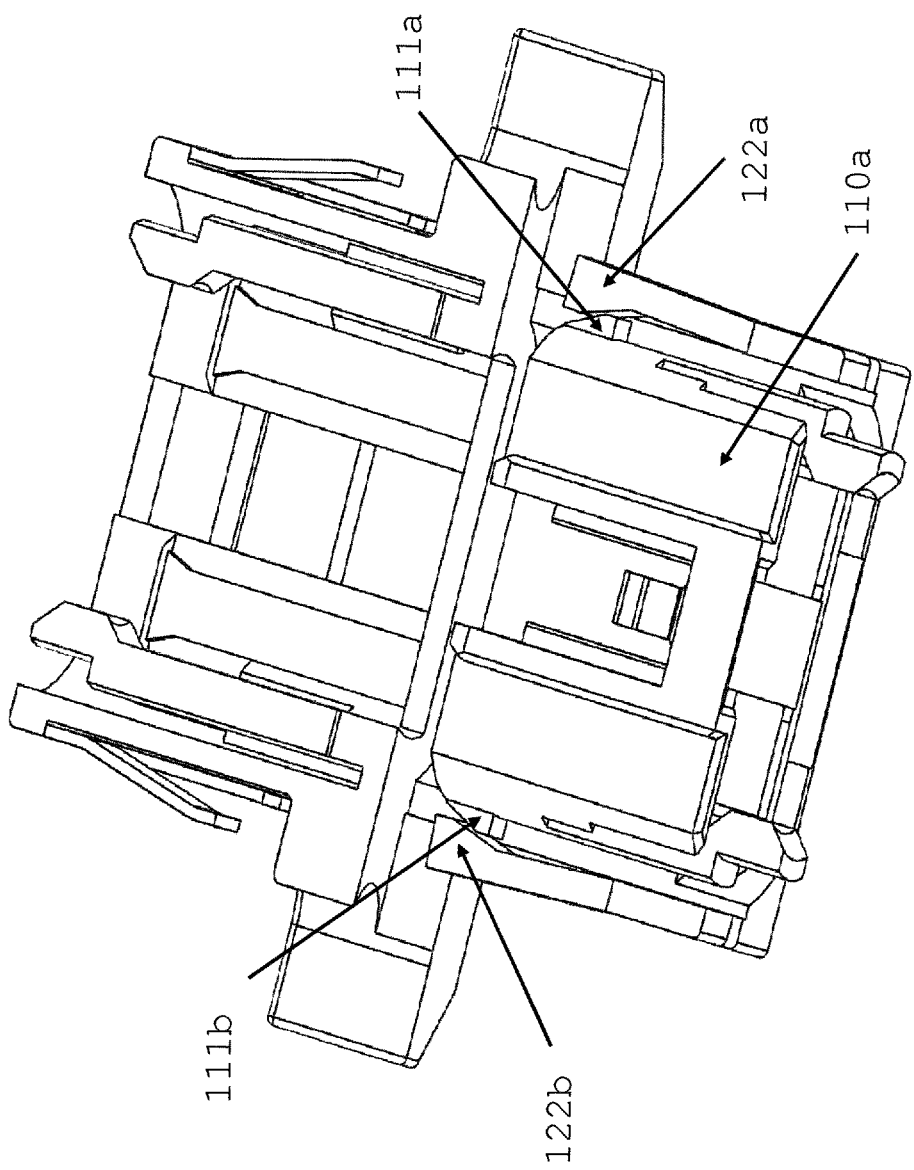
FIG. 5A is a cross-section view of adapter with hook partially inserted therein at a first end and a fixed hook at a second end.
Figure 5B:
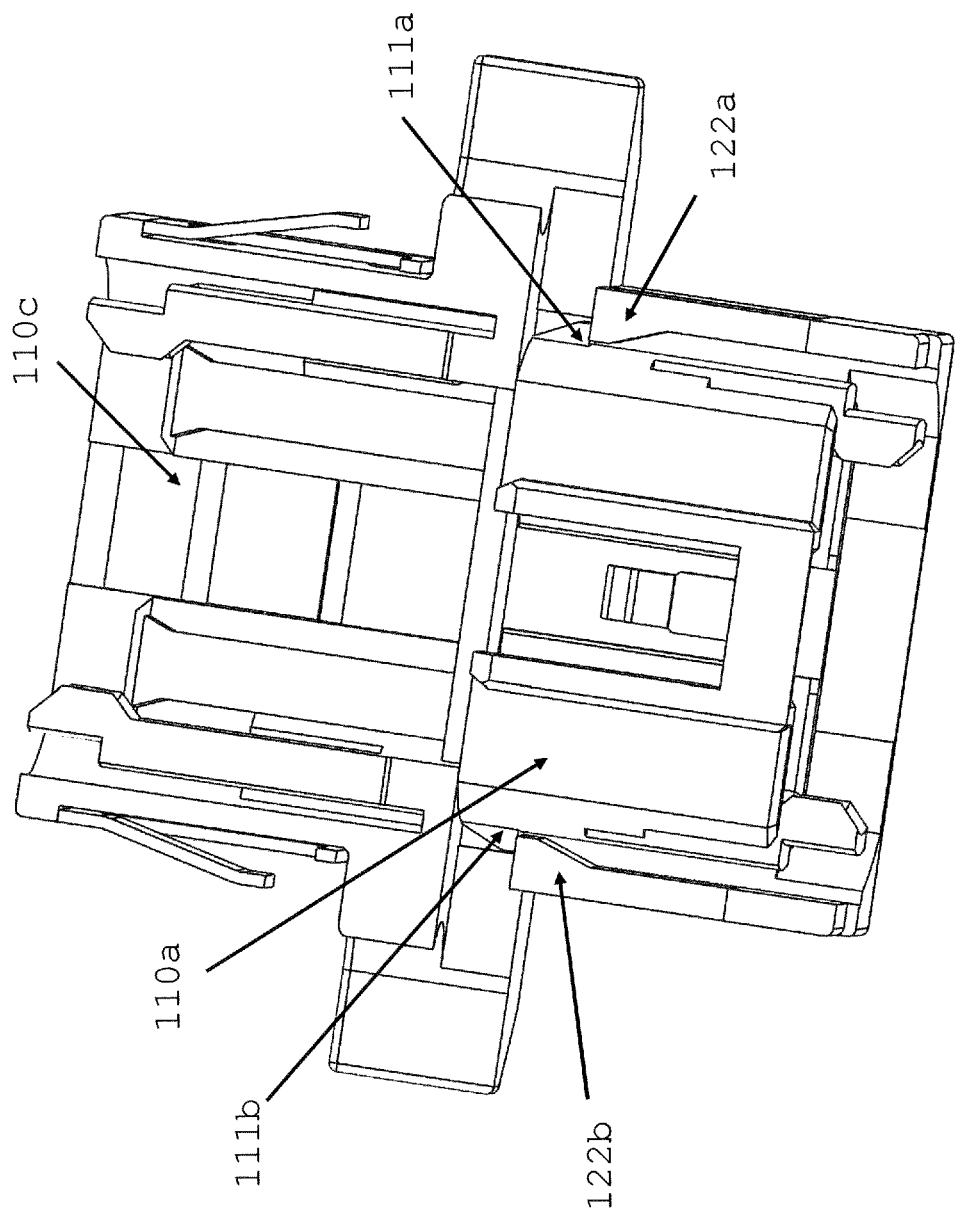
FIG. 5B is a cross-section view of adapter with hook fully inserted therein at a first end and a fixed hook at a second end.

FIG. 1 depicts adapter 120 with first end 124a and second end 124b. Designation "a", "b", "c" and so on refer to the same element that is repeated in a figure or across figures. In the figures, "I" arrow means insert in direction of arrow. In the figures, "A" means in direction of arrow. The adapter receptacle or opening at the first end is configured to accept insert 110 or hook insert 110. The hook insert has corresponding structure on its outer surface, such as one or more protrusions 111a, FIG. 4A, for securing insert 110 inside the adapter receptacle first end 124a or second end 124b, as shown in FIG. 2. And first mating structure 112 accepts second mating structure 334 located on the fiber optic connector. Referring to FIG. 5A, the insert 110 protrusion 111b engages latch 122b as the insert is pushed into the receptacle. Protrusion 111b moves latch 122b outward through an opening in adapter housing, and when the insert is fully inserted into the receptacle. In FIG. 5B, latch 122b blocks protrusion 111b, which prevents hook insert from being removed from the receptacle. The hook insert is shown removed from the adapter in FIG. 1. FIG. 5B shows protrusion 11b locked in behind latch 122a.

Figure 10:
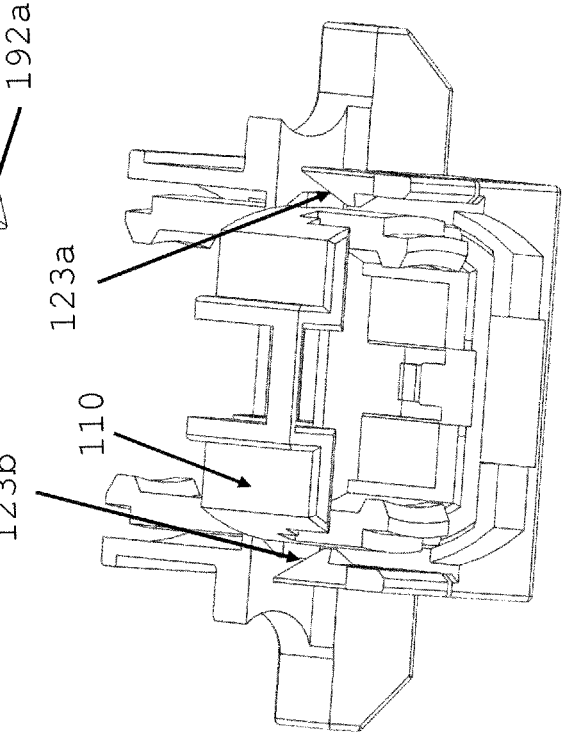
FIG. 10 is a cross-section view of FIG. 7.

FIG. 2 depicts an exploded view of the adapter assembly with adapter 120, hook insert 110a prior to insertion first end 124a, and second hook insert 110b prior to insertion second end 124b of the adapter. The hook insert is inserted into an adapter receptacle or opening in the direction of arrow "A". FIGS. 10 and 13 depict removal tools that remove the replaceable hook insert 110a, 110b to change connector polarity as described herein. Referring to FIG. 2, hook insert 110a has first mating structure 112 that is configured to engage corresponding connector second mating structure 334, FIGS. 3A and 3B, located at a proximal end of a connector. Second mating structure 334 is found on conventional or prior art MPO connectors, as shown in FIG. 3A.1 and FIG. 3B.1.

Figure 3B:
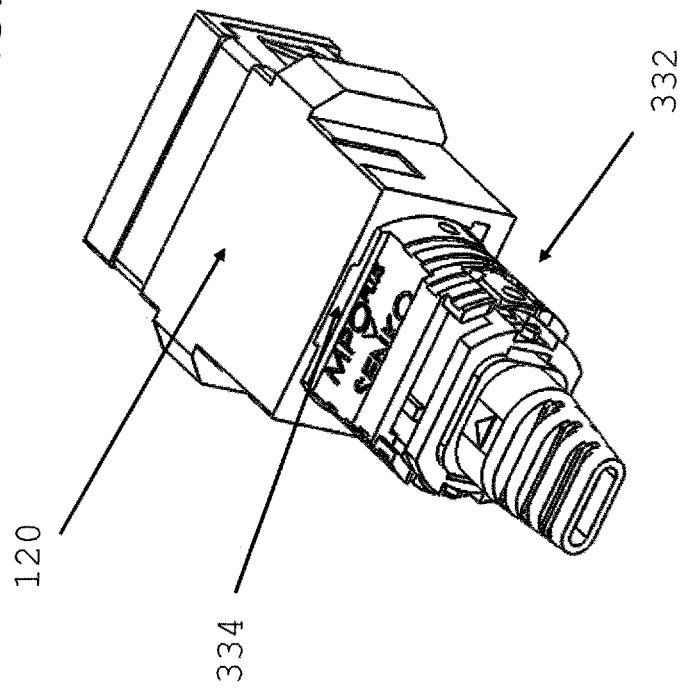
FIG. 3B is a perspective view of the adapter assembly with insert hook and a second prior art connector inserted therein.
Figure 3A:
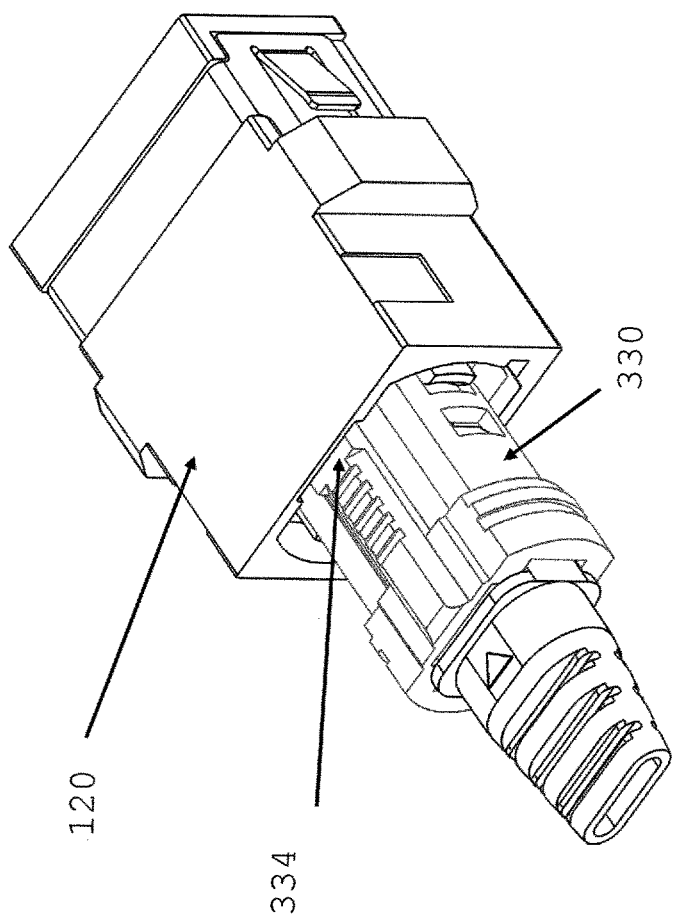
FIG. 3A is a perspective view of the adapter assembly with hook insert and a first connector inserted therein.

FIGS. 3A and 3B depict two prior art MPO fiber optic connectors inserted into adapter assembly 200 at first end 124a. An adapter assembly is formed from an adapter 120, at FIG. 1, with a hook insert (110a, 110b) removably inserted at a first end 124a or a second end 124b or both ends. FIG. 3A is conventional latch MPO connector 330 with connector second mating structure 334 or raised surface 334 accepted by adapter 120 at one end. FIG. 3B is a conventional MPO connector 332 with connector second mating structure 334 accepted by adapter 120. Other connectors such as MT ferrule connectors, similar to the connectors disclosed in Applicants' co-pending application Ser. No. 15/881,309 entitled "Modular Connector and Adapter Devices" can be used with the present disclosure without departing from the scope of this invention.

FIGS. 3A.1 and 3A.2 depict insertion of conventional latch MPO connector 330, FIG. 3A.1, prior to insertion into adapter assembly 200, FIG. 3A.2, of the present invention. Connector second mating structure or second mating structure 334 on connector 330 is accepted at first mating structure 112 on first hook insert 110a with adapter 120 receptacle at first end 124a or a second end 124b with hook insert 110a. Prior to insertion as shown by the dotted line, connector 330 is oriented to allow second mating structure 334 to interconnect with first mating structure 112, which sets a first polarity of the connector at the first end of adapter. Connector 330 when assembled has a fixed polarity, for example ferrule 109a is Tx or transmit while ferrule 109b is Rx or receive. This would need to align with a second connector installed at a second end of adapter, that is, Tx of connector "A" with Tx of connector "B", installed at a first end of adapter, to establish a communication path. If the connector installed in the second end was not accessible, and its Tx was aligned with Rx 109b, removing hook insert 110a, rotating 180 degrees and inserting into the first end would orient connector "A" Tx with fixed connector "B" Tx, thereby, allowing the user to proceed using the conventional connector not having polarity change feature. Rotating hook insert 110 to change adapter polarity configuration, placing the first connector into correct polarity to communicate with the second opposing connector is shown at FIGS. 6A and 6B.

FIGS. 3B.1 and 3B.2 depict conventional MPO 332, FIG. 3B.1, prior to insertion into adapter assembly 120, FIG. 3B.2, of the present invention with hook insert 110a. Connector second mating structure 334 or raised surface 334 mates with first mating structure 112 on hook insert 110, and this predetermines a polarity of connector 332 within a first end of adapter assembly to communicate with a corresponding connector at a second end. Further in this embodiment, the prior art connector has polarity change feature that can be used with adapter assembly 200 invention to change polarity at the adapter.

FIG. 4A depicts adapter assembly 100 with a cross-section view of adapter 120. Latches (122a, 122b) are moved outwards from adapter housing upon insertion of hook insert 110a. Protrusions 111a (111b not shown) moves latch 122a outward as hook insert 110a is inserted into adapter receptacle in the direction of the arrow. Protrusion 111b (refer to FIG. 5A) engages chamfer 123b to ensure the latch and protrusion do not become misaligned and jam hook insert within receptacle disabling the adapter assembly. By contrast, second end 124b contains fixed hook insert 110c with latch 112c, thus second end is not configured for polarity change using removable hook inert 110a. A first polarity positon for the adapter assembly 200 is defined by first mating structure 112 as shown in a first position, refer to FIG. 4A. Once hook inserted is secured within an adapter receptacle at first end 124a, this sets the adapter to a first polarity position.

FIG. 4B depicts adapter 120 prior to accepting hook insert 110a (refer to FIG. 4A), at first end 124a or second end 124b. In FIG. 4B, second end 124b is configured with fixed latches 110c to accept and secure a prior art fiber optic connector therein.

FIG. 5A depicts partially inserting hook insert 110a into the adapter receptacle. Protrusion 111a move latch 122a outward, and likewise protrusion 111b moves latch 122b outward. FIG. 5B depicts latches (122a, 122b) positioned to block its corresponding protrusion (111a, 111b) after hook insert 110a is fully inserted into adapter 120. The adapter is configured in a first polarity position, at the first end. This corresponds with the second end polarity position, which is predetermined by the fixed hook insert 110c. When hook insert 110 is fully inserted or secured with an adapter receptacle, an adapter assembly 200 is formed according to the present invention.

FIGS. 6A and 6B depict polarity change using the adapter assembly. Prior art devices such as U.S. Pat. No. 9,658,509 Gniadek disclose polarity change as part of a connector, not the adapter. The present disclosure teaches polarity change at the adapter. Once a connector is assembled, due to size and number of internal parts it is not possible to reconfigure to a different polarity. The connector will be thrown away. Also, if the installer has connectors of a first polarity, switching the orientation of hook insert 110 allows for a polarity change without attempting to take apart the connector. Also, conventional connectors without a polarity change feature can be used. The latter connectors cost much less.

FIG. 6A depicts hook insert 110 removed from adapter 120, and rotated 180 degrees in arrow direction "P". Hook insert 110 may be rotated in the opposite or counter clockwise direction. FIG. 6B depicts inserting rotated hook insert 110 into adapter 120 in direction of arrow, to change adapter from first polarity 600a to second polarity 600b.

Figure 7:
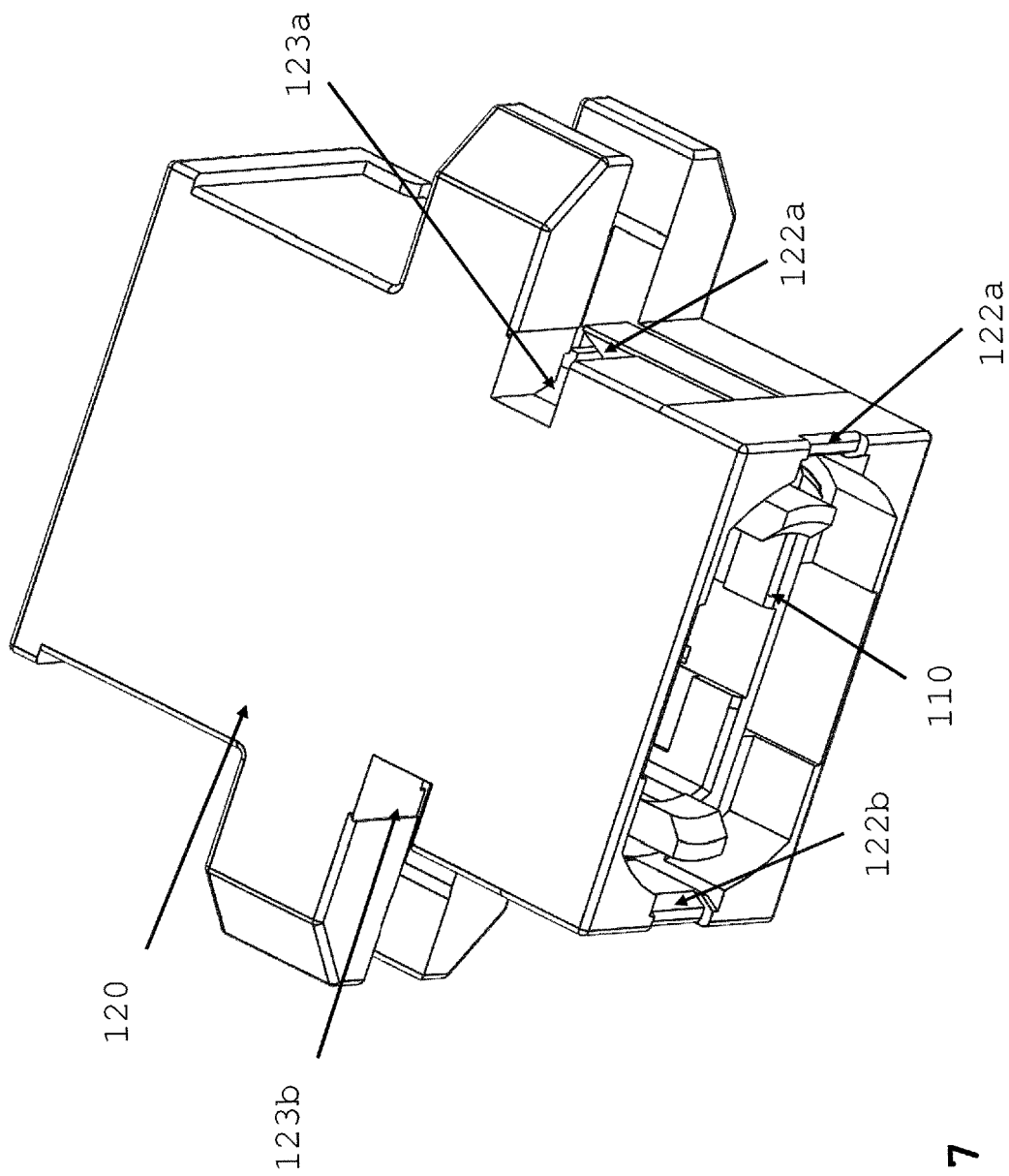
FIG. 7 is a front angled perspective view of adapter with hook insert therein illustrating cut-out for perpendicular removal tool of FIG. 9.

FIG. 7 depicts adapter assembly 700. To remove a hook insert 110, removal tool 190 (FIG. 9) is inserted into slots (123a, 123b) to move latches (122a, 122b) outward so protrusions (111a, 111b) no longer secured by latches (122a, 122b) that prevents removal of hook insert. Once hook insert is removed, adapter polarity is changed as depicted in FIGS. 6A and 6B.

Figure 8:
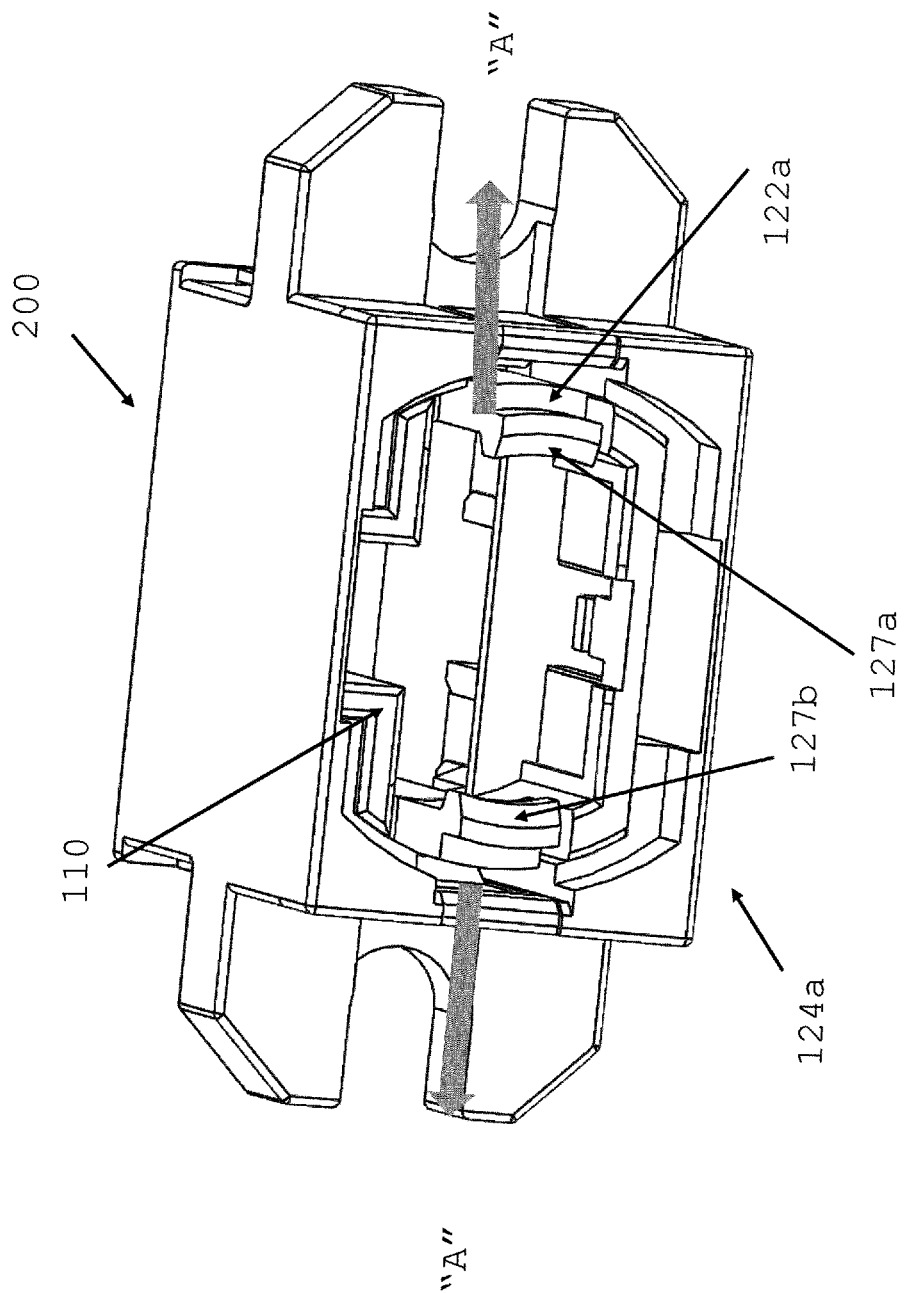
FIG. 8 is a front perspective view of adapter with hook insert therein.

FIG. 8 depicts adapter assembly 800 with hook insert 110 installed at first end 124a. Chamfer 127a engages corresponding protrusion 111a and moves latch 122a in the direction of arrows "A" as shown respectively for each latch.

Figure 9:
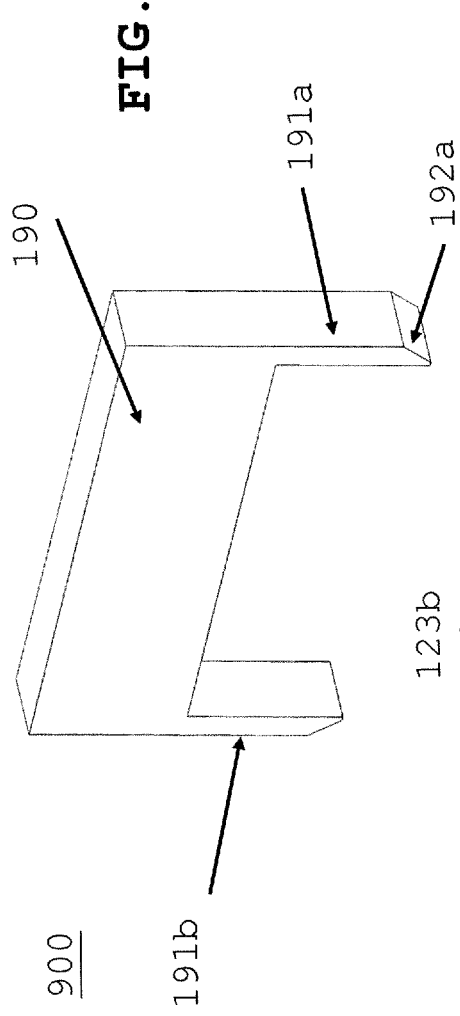
FIG. 9 is a perspective view of presser or perpendicular removal tool.
Figure 12:
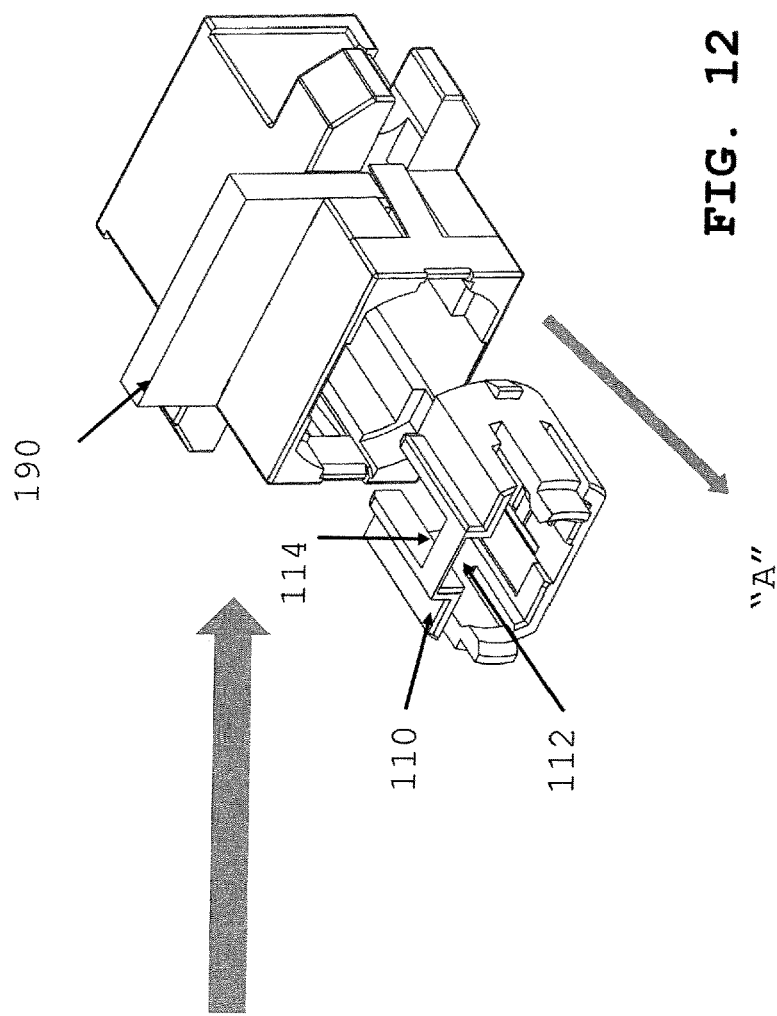
FIG. 12 is an exploded view after hook insert is removed from adapter and perpendicular removal tool fully engaged within adapter.
Figure 11:
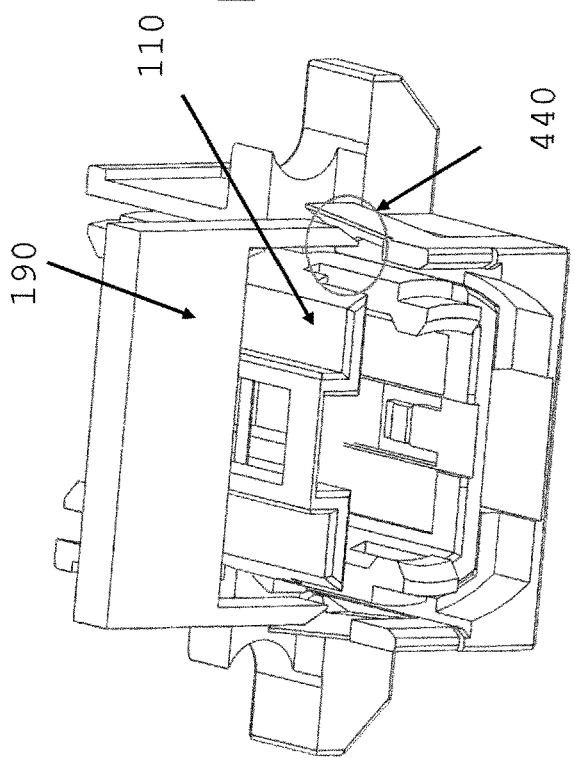
FIG. 11 is a partial cross-section view of FIG. 7 with perpendicular removal tool engaged allowing removal of hook insert.

FIG. 9 depicts horizontal removal tool 190 with a pair of legs (191a, 191b), and at one end of a leg is chamfer 192a. Refer to FIG. 10, chamfer 192a engages latch chamfer 123a and moves latch outward to release hook insert 110 from latch 122a. FIG. 11 depicts chamfer 192a moving corresponding latch 122a as shown in call out 440. Removal tool 190 is partially inserted in slots (123a, 123b). FIG. 12 depicts removal of hook insert 110, in direction of arrow "A". The hook insert is in first mating position 112 for a first adapter polarity.

Figure 16:
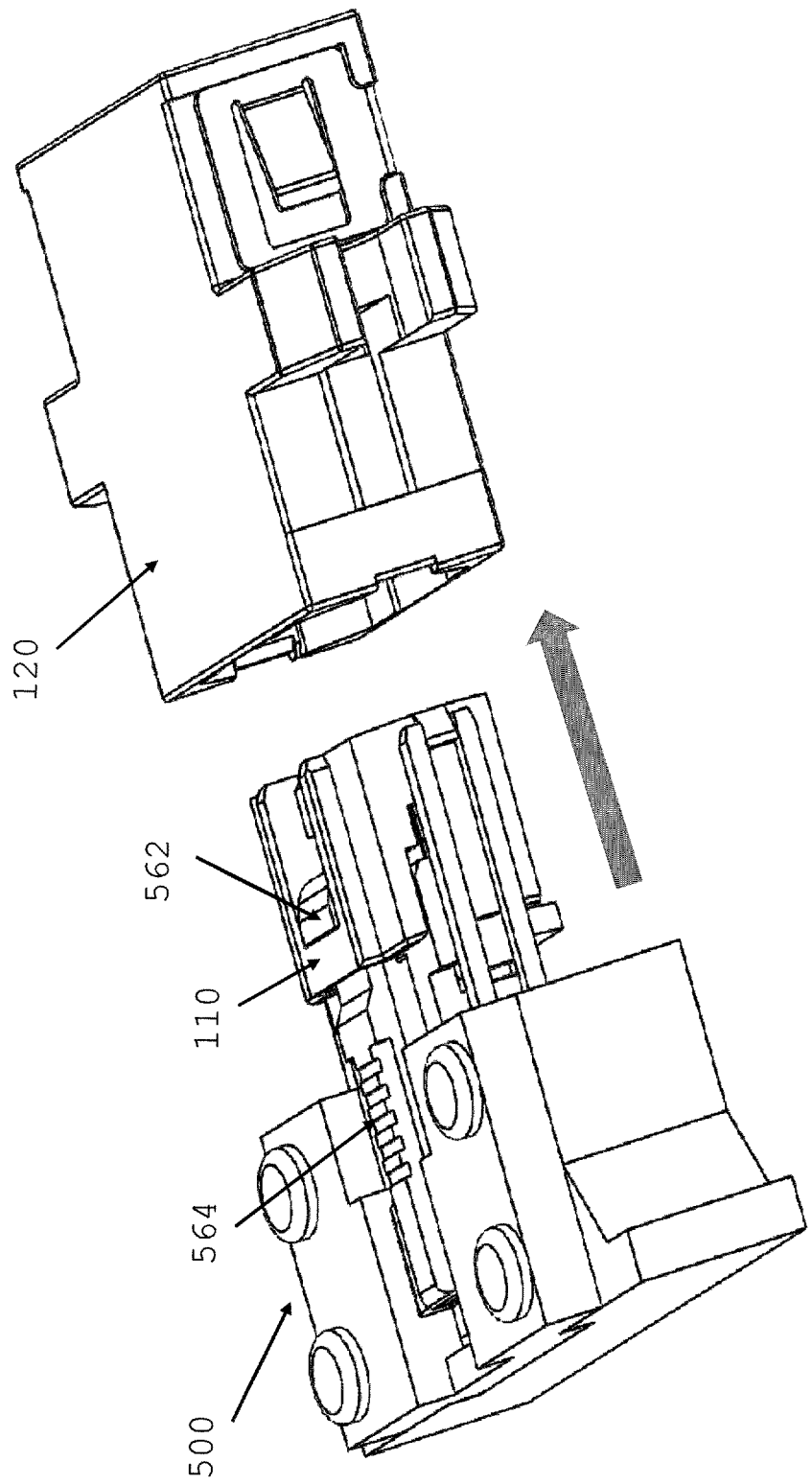
FIG. 16 is an exploded view of insertion tool of FIG. 13 prior to insertion into an adapter.

FIGS. 13-17 depict second removal tool 500 operation. Removal tool 500 releases and removes hook insert 110 from the front or an open side of a receptacle. Using removal tool 190, the user must grasp hook insert 110 to remove the hook insert from the receptacle. This may not be possible due to the micro size of adapters, or the condensed layout of multiple adapters in a rack. FIG. 13 depicts removal tool 500 to help overcome the smaller sized adapter, tool 500 has latch 560 and press pin pair set (562a, 562b) perpendicular to latch 562. FIG. 14 depicts a front view of adapter assembly 200. Slots (126a, 126b) corresponds to pair of press pins (562a, 562b). In operation tool 500 is inserted into first end 124a of receptacle and press pin set (562a, 562b) enters corresponding slots (126a, 126b) disclosed at FIG. 14. As tool 500 is inserted the press pins push out corresponding latches (122a, 122b) as shown in FIG. 15, respectively releasing hook insert 110 from within receptacle. Upon full insertion, latch 560 secures into hook insert opening 114 (FIG. 12), and then when the user withdraws tool 500, hook insert 110 is attached to one end of the removal tool 500, as shown in FIG. 16.

Figure 17:
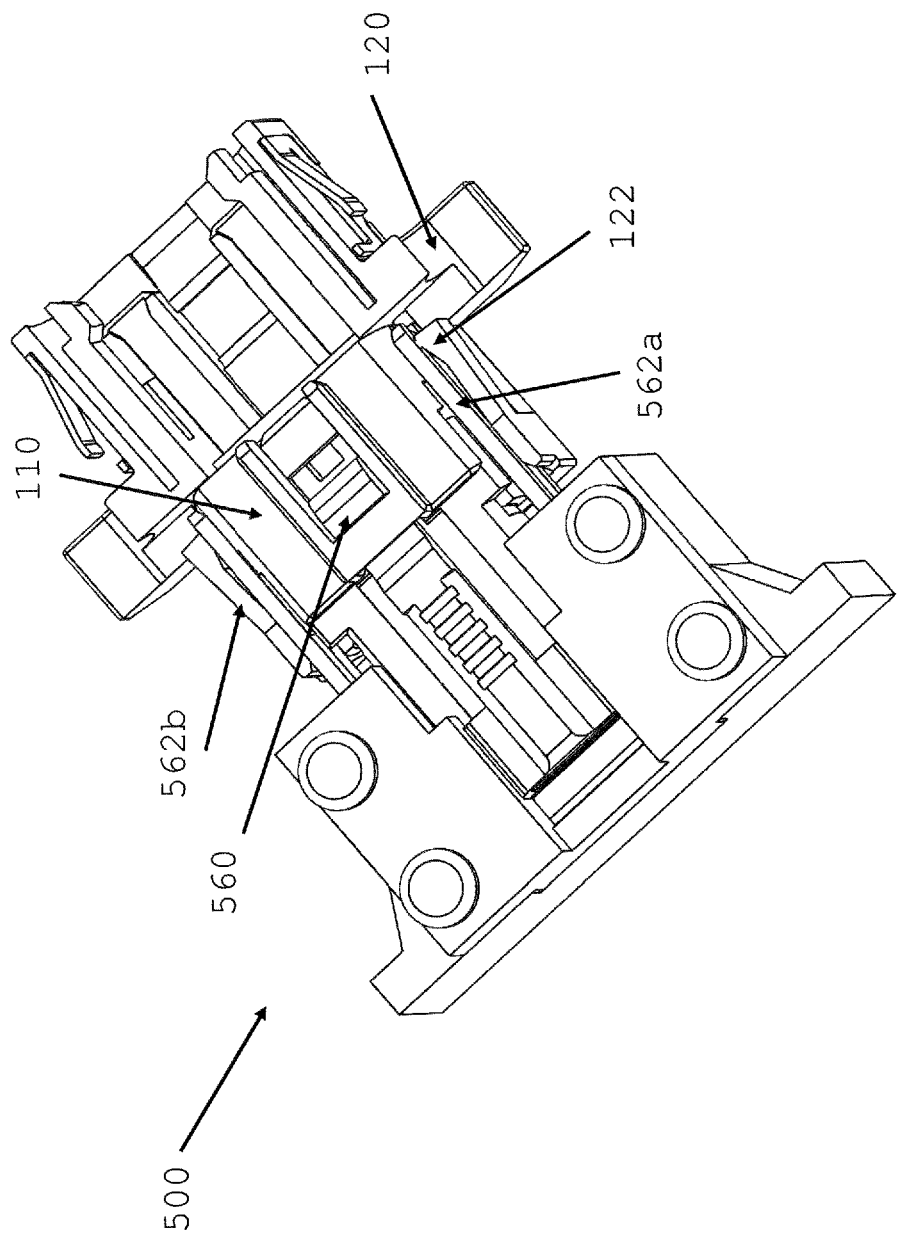
FIG. 17 is a top, perspective view of removal tool of FIG. 13.

FIG. 16 depicts installing insert hook 110 into a first end of adapter 120. Insert hook 110 is secured by latch 562 onto tool 500. User installs hook insert 110 in direction of arrow, and once fully installed user pulls back on release tab 564 which removes latch 562 from opening, and tool 500 can be removed without withdrawing hook insert 110 out of adapter 120. FIG. 17 depicts installed hook insert 110 secured on tool 500 by lath 562. Press pins (562a, 562b) moved outward latches (122a, 122b) respectively. The pins withdraw with tool 500, and latch 122*a* is secured in front of protrusion 111*a*. The opposite side works the same. FIG. 18 depicts two FIG. 1 hooks inserts in opposite polarity positions integrated together along arrows "A" called a dual hook insert.

What is claimed is:

1. An adapter assembly comprising:
   an adapter housing having a first end and a second end spaced apart along a longitudinal axis and comprising a perimeter wall extending from the first end to the second end;
   a hook insert removably receivable within the first end of the adapter housing; and
   wherein the adapter housing comprises a latch on the perimeter wall of the adapter housing and wherein the hook insert comprises an outer surface and a protrusion on the outer surface of the hook insert,
   wherein the latch is configured to engage the protrusion to prevent movement of the hook insert within the adapter,
   wherein the hook insert has a first mating structure configured to accept a second mating structure on a surface of a fiber optic connector to secure the fiber optic connector within the adapter housing;
   wherein the hook insert in a first position within adapter housing configures the connector in a first polarity or the hook insert in a second position within the housing configures the connector in a second polarity; and
   wherein the perimeter wall of the adapter housing comprises an opening extending transverse to the longitudinal axis, the opening providing access to at least one of the latch and the protrusion such that the latch can be disengaged from the protrusion through the opening to allow the hook insert to be removed from the adapter housing.

2. The adapter assembly of claim 1, wherein the fiber optic connector is a multi-fiber push-on/push-off or a mechanical transfer.

3. The adapter assembly of claim 1, wherein at least a portion of the hook insert is configured as a multi-fiber push-on/pull-off or a mechanical transfer hook insert capable of receiving the corresponding fiber optic connector.

4. The adapter assembly of claim 1, wherein the first mating structure is an opening formed as part of the hook insert.

5. The adapter assembly of claim 4, wherein the first mating structure is channel, raised surface, or channel as part of the hook insert.

6. The adapter assembly of claim 1, wherein a pair of latches are permanently secured within the second end of the adapter housing to form a fixed hook insert.

7. A hook insert assembly, comprising:
   a hook insert housing having a first end opening and a second end opening spaced apart along a longitudinal axis, the hook insert housing further comprising a first side wall and a second side wall spaced apart along a lateral axis perpendicular to the longitudinal axis,
   wherein the first side wall of the hook insert housing comprises a latching element configured to accept a latch or a hook of an adapter receptacle for securing the hook insert housing within the adapter receptacle;
   wherein the first side wall of the hook insert housing further comprises a first mating structure adjacent the first end opening for securing a fiber optic connector within the adapter receptacle.

8. The hook insert assembly according to claim 7, further comprising the fiber optic connector, the fiber optic connector including
   a second mating structure,
   the second mating structure configured to interconnect with the first mating structure on the hook insert housing to secure the fiber optic connector within the hook insert housing; and
   the hook insert housing in a first position within the adapter receptacle configures the fiber optic connector in a first polarity, and the hook insert housing in a second position within the adapter, opposite the first position, the second position configures the fiber optic connector in a second polarity.

9. The hook insert assembly of claim 8, wherein the fiber optic connector is a multi-purpose push/push off or mechanical transfer ferrule fiber optic connector.

10. The hook insert assembly of claim 8, wherein the adapter receptacle is configured to accept a dual hook insert.

11. The hook insert assembly of claim 8, in combination with the adapter receptacle, and wherein the adapter receptacle is a first adapter receptacle, the hook insert assembly further comprising an adapter housing, wherein the adapter housing further comprises a second adapter receptacle configured to accept a second hook insert.

12. The hook insert assembly of claim 11, wherein the hook insert is removable from the second adapter receptacle.

13. The hook insert assembly of claim 8, wherein the hook insert housing is removable from the adapter receptacle.

14. The hook insert assembly of claim 8, further comprising an adapter housing defining the adapter receptacle and another adapter receptacle comprising a pair of latches permanently secured therein.

* * * * *